Jan. 29, 1957  E. F. BACON  2,779,442
VIBRATION DAMPER FOR GAGES
Filed April 22, 1947
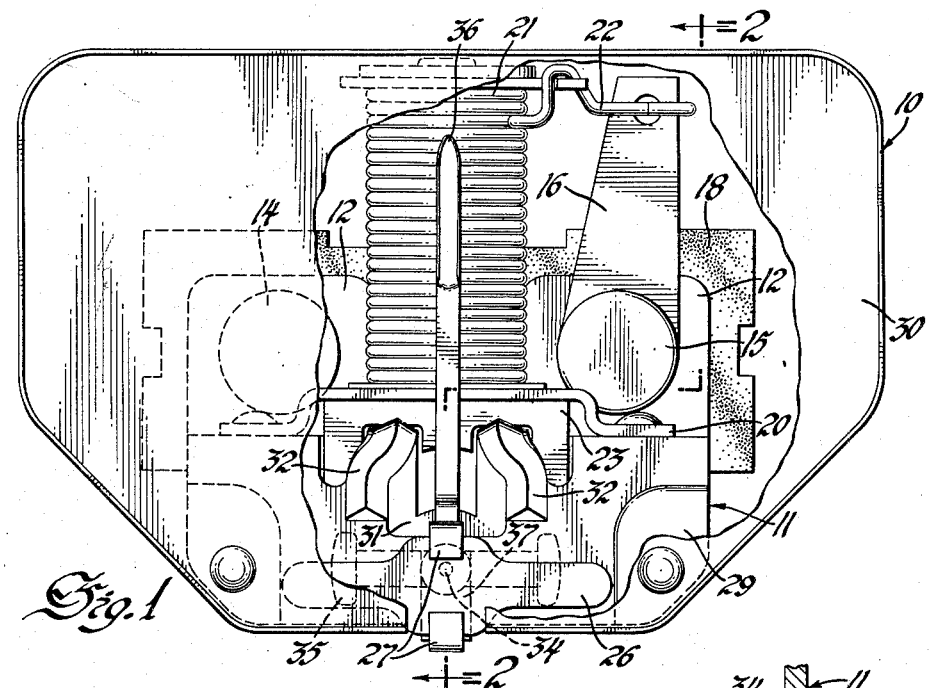
Fig. 1
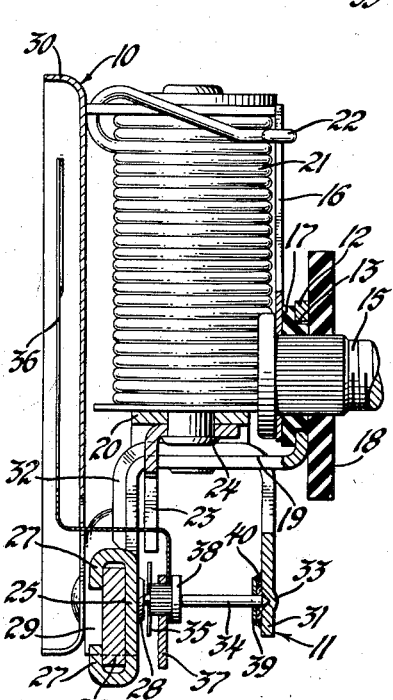
Fig. 2
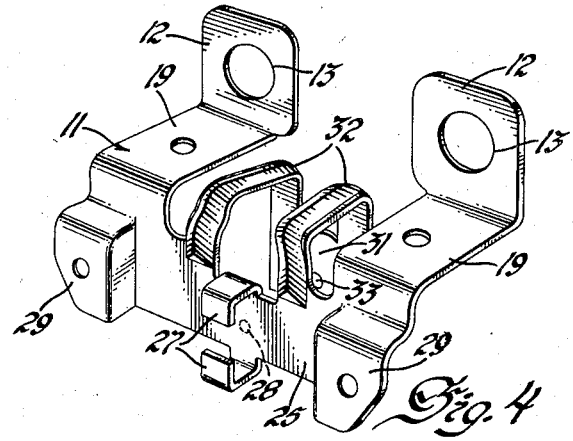
Fig. 3
Fig. 4
Inventor
Elbridge F. Bacon
By
Spencer, Willits, Helmig & Baillie
Attorneys United States Patent Office 2,779,442
Patented Jan. 29, 1957

2,779,442

VIBRATION DAMPER FOR GAGES

Elbridge F. Bacon, Flint, Mich., assignor to General Motors Corporation, Detroit, Mich., a corporation of Delaware Application April 22, 1947, Serial No. 743,218

3 Claims. (Cl. 188—90)

This invention relates to gages having a swingable pointer and particularly to means for damping the oscillations of the pointer.

In ammeters, particularly those used on automotive vehicles, the mechanical and electrical vibrations cause the pointer to vibrate or flutter and at times render the reading of the instrument difficult. It is the object of the present invention to incorporate in a gage or meter a simplified construction that will reduce these oscillations or vibrations to a degree that will make them unobjectionable and which render the reading of the instrument easy at all times.

In the prior art it is known to employ mechanical damping means consisting of a damping disc positioned between retaining discs and producing the damping effect by frictional contact with the shaft or discs. With this type of construction it is difficult to manufacture meters with uniform damping effect due to the close tolerances required and to maintain the damping effect constant in service due to wear of the moving parts.

It is an object of the present invention to provide a simplified fluid vibration damper suitable for instrument shafts.

On the drawing—

Figure 1 is an elevation view of an ammeter to which the invention is applied with the dial partially removed to show the operating mechanism.

Figure 2 is a cross section on the line 2—2 of Figure 1.

Figure 3 is an enlarged detail view of the damping device.

Figure 4 is a perspective view of the ammeter supporting frame.

Referring to the drawing, the numeral 10 generally indicates the dial and operating mechanism of the ammeter which may be mounted in the conventional manner, though not shown, in a cup-shaped casing or on an instrument panel. The ammeter mechanism is mounted on a supporting frame 11 illustrated in Figure 4, which has two feet 12 suitably apertured at 13 to receive the bolts 14 and 15. The bolts support the ammeter mechanism and provide the electrical connections. The bolt 14 is in contact with the frame 11, while the bolt 15 carries a conductor 16, and both the bolt and conductor are insulated from the frame 11 by the insulating washer 17. The insulating pad 18 insulates the frame 11 from the casing or panel, not shown, upon which the ammeter 10 is secured by bolts 14 and 15.

On the horizontal portion 19 of frame 11 a bridge 20 is secured by the rivets as shown, which supports the coil 21. One electrical connection of the coil is made by the wire 22 to the conductor 16, while the other connection is grounded to the frame. The coil 21 and pole-piece 23 are secured below the bridge by an extension of the coil core 24, which extends through apertures in the bridge 20 and the pole-piece 23 and is suitably riveted.

On the face of the vertical and transverse section 25 of the frame 11 a permanent magnet 26 is secured by two integral tongues 27 which are bent around the magnet. On the back of transverse section 25 a suitable boss is pressed to form a pivot bearing 28. At each end of section 25 a raised section 29 of the frame 11 provides a support and riveting point for the dial 30.

To provide the rear pivot bearing portion 31 two spaced secondary legs 32 are formed integral with the transverse section 25 and extend upwardly, rearwardly and downwardly as shown in Figure 4. The bearing may be a pressed button as shown at 33. The shaft 34 with suitable pivot bearing ends is mounted in the bearings 28 and 33. At the forward end of the shaft and in line with the pole-piece 23 an armature 35 is secured to the shaft. The pointer 36 and its counterweight 37 are secured to the shaft adjacent the armature by the bushing 38.

In order to dampen the oscillations or vibrations of the pointer 36 a fluid friction vibration damper is employed on the shaft. The damper consists of a small disc 39 secured to the shaft 34 closely adjacent one end. The disc 39 is positioned in a plane parallel to the plane of the adjacent surface of the portion 31 of the frame surrounding the bearing 33. A few drops of high viscosity liquid 40, such as silicone fluid, are placed between the disc 39 and the frame 31. Though the liquid 40 is not confined about its perimeter by structural means, the capillary action or surface tension and the wetting ability of the liquid with respect to the surface used bear the proper relation to each other to retain the liquid in a substantially fixed position and a confined volume by the peripheral meniscus in contact with the complementary surfaces of the disc 39 and the frame 31. The surface tension of the liquid in order to be sufficient to retain the liquid in the confined position must create a contracting force greater than the displacing forces due to gravity and the centrifugal moment. Depending on the damping requirements, the space between the rotating element, such as disc 39, and the fixed element, such as frame portion 31, may be varied from a few thousandths of an inch to about one thirty-second of an inch, while the Brookfield viscosity of the silicone fluid may vary from about 75,000 to 250,000 centistokes at 25° C. in the usual applications. When employing liquids with higher surface tension the size of the space may be increased. As presently employed on automotive type ammeters the damper disc 39 is about one-eighth inch in diameter and is spaced .014 inch from the fixed frame section 31. The fluid employed is a silicone fluid with a Brookfield viscosity of 203,000 centistokes at 25° C. By employing high viscosity silicone fluid with a viscosity of about 175,000 to 250,000 centistokes at 25° C. proper damping effect can be obtained with an extremely small fluid contact area, as illustrated in the above preferred embodiment.

This damper provides through a simplified construction a reliable damper in which the damping effect produced by the viscosity of the fluid will not vary due to wear and temperature changes. In some applications where a smaller damping effect would be satisfactory the silicone fluid may be placed in the space formed in the usual pivot bearing without using a disc. Due to the relatively constant viscosity of silicone fluids with variations in temperature, the damping effect produced by this construction remains substantially constant.

This preferred embodiment of the damper made in accordance with the invention is merely illustrative of the generic inventive concept presented in the present application and defined in the claims. Thus numerous modifications and embodiments within the scope of the appended claims will be apparent to those skilled in the art.

I claim:

1. In a damping unit of the character described, a pair of relatively rotatable elements having bearing support one on the other, said elements having a pair of complemental surface portions arranged so as to rotate one with respect to the other when said members partake of relative rotary movement, said surface portions being shaped and arranged close together in face to face relation to form a space between said surface portions having a width undiminished at the perimeter, said elements being so arranged as to normally permit free egress of liquid from said space under the influence of gravity, a body of substantially constant high viscosity silicone liquid having free flowing characteristics under the influence of gravity under all operating conditions of said damping unit, and having high surface tension and high wetting action, said body being positioned in said space, said silicone liquid having a contacted surface part contacting and wetting said surface portions facing said space and adhering to said surface portions and a peripheral free surface part extending between said elements providing a surrounding peripheral meniscus formed by the high surface tension characteristic of said silicone liquid adhering to said surface portions around the perimeter of said surface portions and extending over the free surface part of said body of silicone liquid, said space between said complemental surface portions being sufficiently small that said body of silicone liquid is entirely supported by the coaction of said wetting action adhering the silicone liquid and meniscus to said complemental surface portions and said meniscus entirely supporting said body of silicone liquid in said space between said complemental surface portions to prevent egress of said liquid from said space, and said silicone liquid cooperating with said complemental surface portions to offer viscous liquid shear resistance and damp relative rotary vibrational movement between said relatively rotatable elements.

2. In a relatively small lightweight instrument of the character described, a pair of relatively rotatable elements having bearing support one on the other, said elements having a pair of complemental surface portions arranged so as to rotate one with respect to the other when said members partake of relative rotary movement, said surface portions being shaped and arranged close together in face to face relation to form a space between said surface portions having a width undiminished at the perimeter, said elements being so arranged as to normally permit free egress of liquid from said space under the influence of gravity, said surface portions being substantially uniformly spaced from each other in all positions of relative rotation, a body of substantially constant high viscosity silicone liquid having free flowing characteristics under the influence of gravity under all operating conditions of said damping unit, and having surface tension and high wetting action positioned in said space, said body of silicone liquid having a contacted surface part contacting and wetting said surface portions facing said space and adhering to said surface portions and a peripheral free surface part extending between said elements providing a surrounding peripheral meniscus formed by the high surface tension characteristic of said silicone liquid adhering to said surface portions around the perimeter of said surface portions and extending over the free surface part of said body of silicone liquid, said space between said complemental surface portions being sufficiently small that said body of silicone liquid is entirely supported by the coaction of said wetting action adhering the silicone liquid and meniscus to said complemental surface portions and said meniscus entirely supporting said body of silicone liquid in said space between said complemental surface portions during relative rotation to prevent egress of said silicone liquid from said space, and said silicone liquid cooperating with said complemental surface portions to offer viscous liquid shear resistance and damp relative rotary vibrational movement between said relatively rotatable elements.

3. The invention defined in claim 2, said silicone liquid having a viscosity substantially between 75,000 and 250,000 centistokes at 25 degrees centigrade.

References Cited in the file of this patent

UNITED STATES PATENTS

| | | |
|---|---|---|
| 1,519,675 | Ford | Dec. 16, 1924 |
| 1,754,085 | Faus | Apr. 8, 1930 |
| 1,951,578 | Peters | Mar. 20, 1934 |
| 2,125,016 | Gruver | July 26, 1938 |
| 2,167,083 | Nulsen et al. | July 25, 1939 |
| 2,343,372 | Ford et al. | Mar. 7, 1944 |
| 2,365,487 | Murray | Dec. 19, 1944 |
| 2,408,392 | Gillum et al. | Oct. 1, 1946 |
| 2,417,282 | Wheeler | Mar. 11, 1947 |
| 2,446,431 | Pfeffer | Aug. 3, 1948 |
| 2,518,928 | Paine et al. | Aug. 15, 1950 |